(12) United States Patent
Yu et al.

(10) Patent No.: US 7,999,899 B1
(45) Date of Patent: Aug. 16, 2011

(54) FRINGE FIELD SWITCHING LIQUID CRYSTAL DISPLAY APPARATUS

(75) Inventors: Chia Hua Yu, Banqiao (TW); I-Fang Wang, Changhua (TW); Feng-Weei Kuo, Fangliao Township (TW); Ko-Ruay Jen, Taipei (TW); Guang-Shiung Chao, Kaohsiung (TW)

(73) Assignee: Hannstar Display Corp., Taipei (TW)

( * ) Notice: Subject to any disclaimer, the term of this patent is extended or adjusted under 35 U.S.C. 154(b) by 0 days.

(21) Appl. No.: 13/013,440

(22) Filed: Jan. 25, 2011

(51) Int. Cl.
  *G02F 1/1343* (2006.01)
(52) U.S. Cl. .................... 349/143; 349/139; 349/141
(58) Field of Classification Search .............. 349/141, 349/139, 146, 148, 143, 138
  See application file for complete search history.

(56) References Cited

U.S. PATENT DOCUMENTS

| | | | |
|---|---|---|---|
| 6,233,034 B1 | 5/2001 | Lee et al. | |
| 6,449,026 B1 | 9/2002 | Min et al. | |
| 6,522,380 B2 | 2/2003 | Lee et al. | |
| 6,580,487 B1 | 6/2003 | Kim et al. | |
| 6,747,712 B2 | 6/2004 | Noh et al. | |
| 7,199,850 B2 | 4/2007 | Jun | |
| 7,212,270 B2* | 5/2007 | Takatori et al. | 349/144 |
| 7,812,893 B2 | 10/2010 | Yagi et al. | |
| 7,903,219 B2* | 3/2011 | Sakurai et al. | 349/138 |
| 2008/0068523 A1* | 3/2008 | Mitsui et al. | 349/37 |
| 2009/0108259 A1* | 4/2009 | Lin et al. | 257/59 |
| 2010/0007834 A1 | 1/2010 | Song et al. | |
| 2010/0007837 A1 | 1/2010 | Ham et al. | |
| 2010/0259703 A1 | 10/2010 | Song | |

OTHER PUBLICATIONS

Youn et al. "Optimal pixel design for low driving, single gamma curve and single cell-gap transflective fringe-field switching liquid crystal display," Liquid Crystals, vol. 35, No. 2, Feb. 2008, pp. 187-194.

* cited by examiner

*Primary Examiner* — Thoi Duong
(74) *Attorney, Agent, or Firm* — Volpe and Koenig, P.C.

(57) ABSTRACT

A fringe field switching liquid crystal display apparatus is provided. This apparatus includes a first electrode disposed in a stacked relationship with a second electrode. The first electrode includes a first side edge, a second side edge, and plural spaces that define plural strips between the first and the second side edges, wherein the plural strips and the plural spacings form a first area. The second electrode is disposed on one of places above and below the first electrode, and has at least a penetrating vacancy or other capacitance-reduction device, which has a projection onto the first electrode located outside the first area.

19 Claims, 7 Drawing Sheets

FRINGE FIELD SWITCHING LIQUID CRYSTAL DISPLAY APPARATUS

FIELD OF THE INVENTION

The present invention relates to a liquid crystal display apparatus, especially to a fringe field switching liquid crystal display apparatus.

BACKGROUND OF THE INVENTION

Currently the liquid crystal displays (LCDs) have been dominating in almost all the major display markets for several applications, such as monitors, mobile phones, televisions, notebook computers, tablet personal computers (PCs), global positioning system (GPS) devices, portable video players, as the technologies of the LCD have been developing widely, deeply and quickly.

The liquid crystals play the role of light valves to control the light transmission and the light blocking at instantaneous display time in each pixel of the LCD. In the view of the control mechanisms of the liquid crystals, the LCD can be divided into the types of the vertical alignment (VA) and the plane switching.

The VA type can be further divided into several sub-types. Generally, the VA type LCD has very fast response time for the liquid crystals, and is especially suitable for displaying the video showing very fast movements. However, when the user presses the LCD screen by fingers or other objects, the vortex-shaped pattern appears at the place being pressed on the screen of the LCD, because the interval of the vertical alignment of the liquid crystals are shortened by such vertically pressing on the screen. In this aspect, the VA LCD is not suitable to be used for the touch-panel display, since the screen of the touch-panel display tends to be frequently touched and pressed by the user's finger, and the displayed picture thereof will be blurred at anywhere is being touched.

On the other hand, the plane switching type LCDs, including the in-plane switching (IPS) and the fringe field switching (FFS) LCDs, do not have this kind of problem, and provide good performance for the touch-panel display, since the liquid crystal alignments thereof occur in the plane (horizontal) direction rather than the vertical direction. Generally, FFS LCD has larger aperture ratio and transmittance than those of IPS LCD, and makes itself as a good candidate for the portable touch-panel display. However, the charging time for the counter electrode in each pixel of the typical FFS LCD is not short enough, and results in the long response time.

Figure 1:
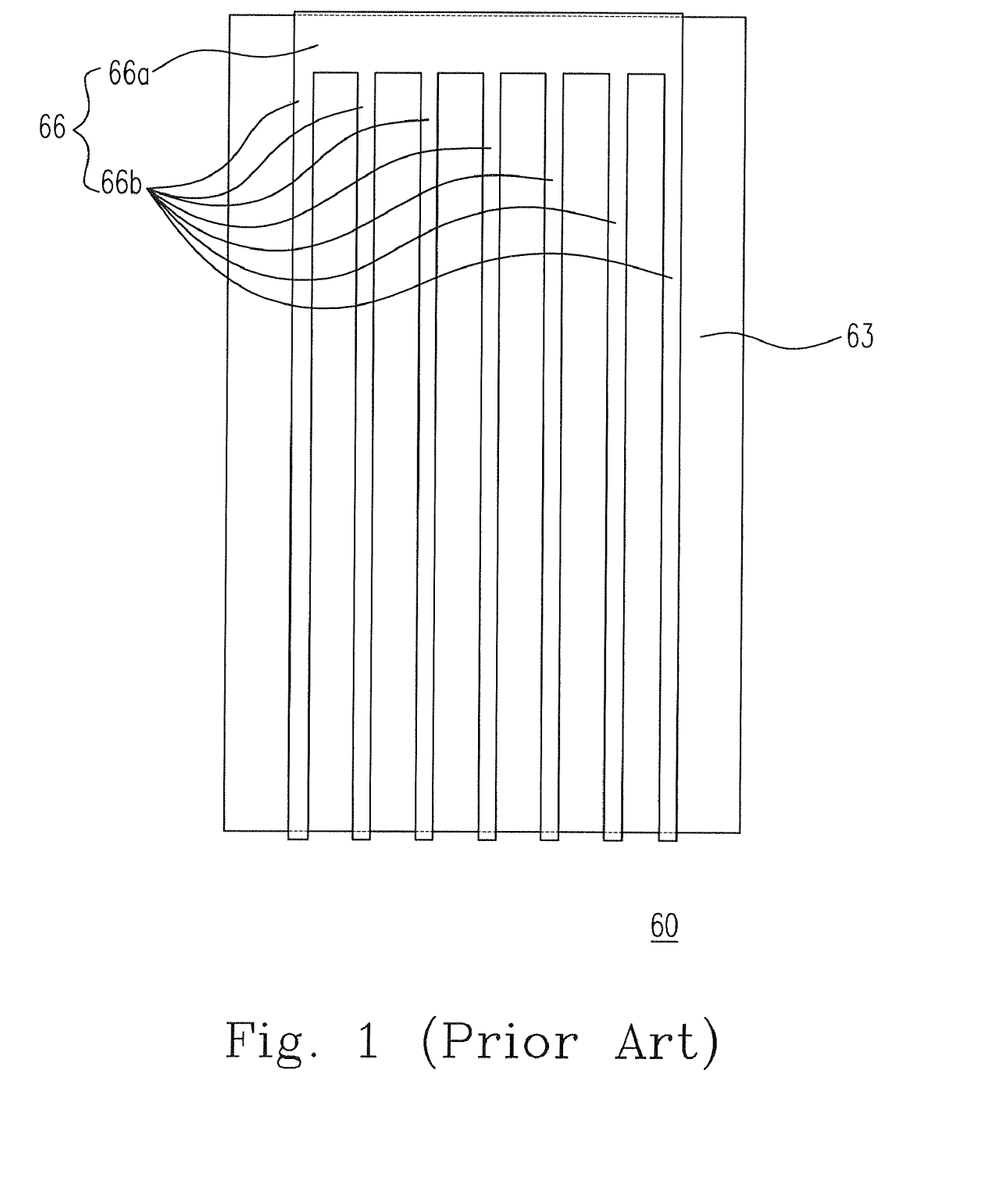
FIG. 1 is the schematic diagram showing a top view of a pixel in a conventional FFS LCD apparatus of the prior art.

Please refer to FIG. 1, which show a top view of a pixel in an FFS LCD in the prior art. In FIG. 1, the pixel electrode 66 consists of the body 66a and strips 66b, while the counter electrode 63 is a plane electrode. Since the area of the counter electrode 63 almost covers the entire pixel, therefore the capacitance of the counter electrode to be charged is large. Accordingly, the capacitance charging time for the counter electrode is long, and the response time may not be short enough for the video display.

Figure 2:
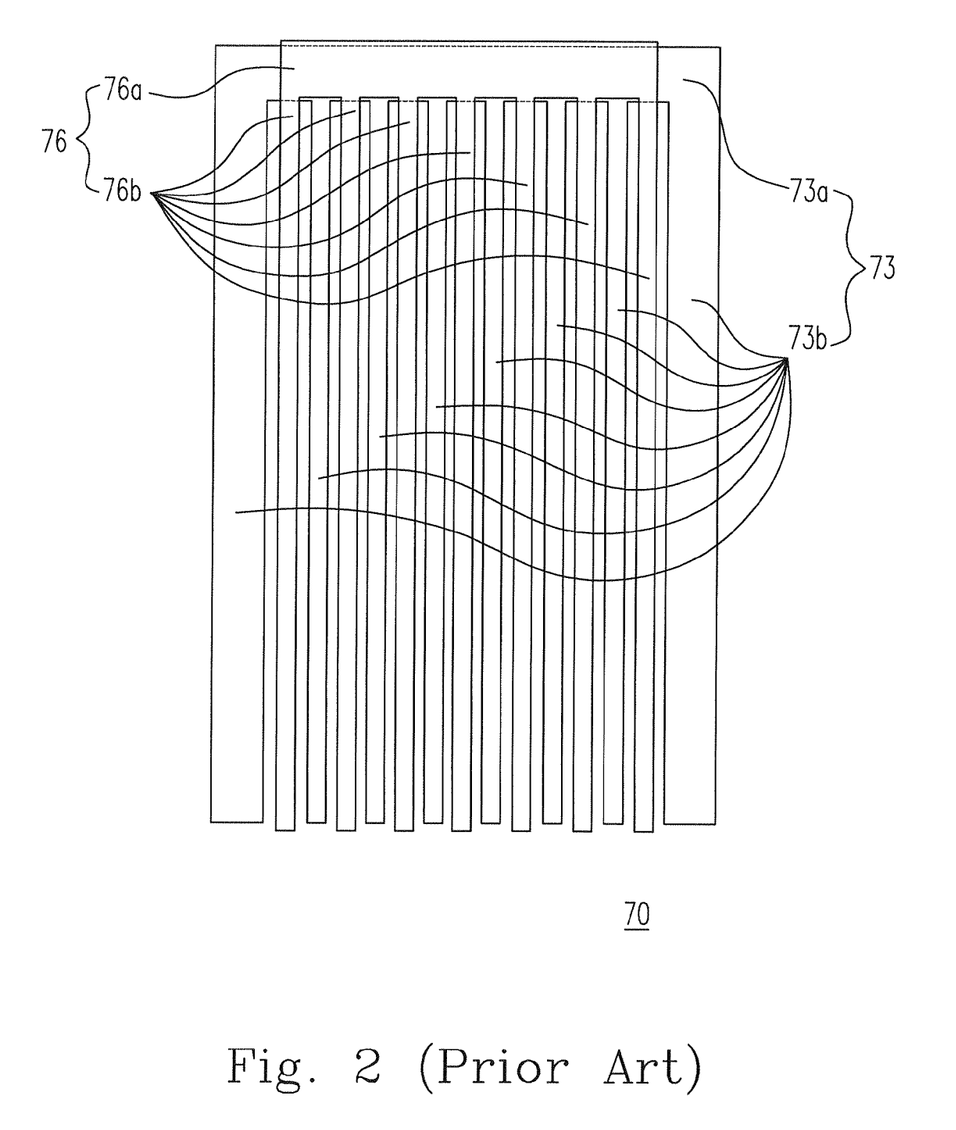
FIG. 2 is the schematic diagram showing a top view of a pixel in another conventional FFS LCD apparatus of the prior art.

Please refer to FIG. 2, which show a top view of a pixel in an FFS LCD in the prior art. In FIG. 2, the pixel electrode 76 consists of the body 76a and strips 76b; while the counter electrode 73 consists of the body 73a and strips 73b. It can be seen from FIG. 2 that the strips 73b of the counter electrode 73 interleave the strips 76b of the pixel electrode 76 from the top view. That is to say, each of the strips 73b of the counter electrode 73 is located in the projection of the spacing between two adjacent strips 76b of the pixel electrode 76. Although the capacitance of the counter electrode 73 in FIG. 2 is lower than that in FIG. 1 due to the smaller area of the counter electrode 73 in FIG. 2 than that in FIG. 1, the strip structures of the counter electrode 73 and the pixel electrode 76 in FIG. 2 cause the difficulty in the assembly of these two electrodes, since the strips 73b of the counter electrode must perfectly interleave the strips 76b of the pixel electrode to generate the uniform desired electrical field for rotating the liquid crystals. The slight position shift between the pixel electrode and the counter electrode will result in the slight shift in the alignment of the liquid crystals, which however will catastrophically and tremendously decrease the contrast ratio of the LCD due to the light leaking, since the contrast ratio is defined as the maximum brightness divided by the minimum brightness.

For overcoming the above-mentioned drawbacks existing in the conventional techniques, the novel FFS LCD apparatuses are provided in the present invention with the advantages of short charging time and excellent display performance.

SUMMARY OF THE INVENTION

The present invention provides the FFS LCD apparatuses.

In accordance with one aspect of the present invention, a fringe field switching (FFS) liquid crystal display (LCD) apparatus is provided. This apparatus includes a first electrode and a second electrode. The first electrode includes a first side edge, a second side edge, and plural spacings that define plural strips disposed between the first and the second side edges, each of the strips is formed between two of the plural spacings, wherein the plural strips and the plural spacings form a first area. The second electrode is disposed in a stacked relationship with the first electrode, and has at least a penetrating vacancy, which has a projection onto the first electrode located outside the first area. Preferably, the first electrode is a pixel electrode of a FFS LCD and the first area is operative for fringe field switching in the FFS LCD. Preferably, the second electrode has a plurality of capacitance-reduction devices that have symmetric projections onto a border area surrounding the first area of the first electrode on at least two opposite sides of the first area.

In accordance with another aspect of the present invention, an FFS LCD apparatus is provided. This apparatus includes a first electrode and a second electrode, which is disposed in a stacked relationship with the first electrode, and has a polygonal shape having n sides, wherein n is an integer larger than four.

In accordance with a further aspect of the present invention, an FFS LCD apparatus is provided. This apparatus includes a first electrode; and a second electrode, which is disposed in a stacked relationship with the first electrode. Preferably, the first electrode is a pixel electrode that has a first area defined within a border area thereof such that the first area is operative for fringe field switching in the FFS LCD. The second electrode has at least a capacitance-reduction device that has a projection onto the border area of the first electrode. Preferably, the second electrode has a plurality of capacitance-reduction devices that have projections onto the border area of the first electrode on at least two opposite sides of the first area. Preferably, the second electrode has a plurality of capacitance-reduction devices that have symmetric projections onto the border area of the first electrode on at least two opposite sides of the first area. Preferably the first area of the first electrode is defined by a plurality of substantially parallel spacings that define a plurality of substantially parallel strips. Preferably the first area spacings are of a uniform size and the first area strips are of a uniform size which may or may not be the same size as the spacings.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

First Embodiment

Figure 3A:
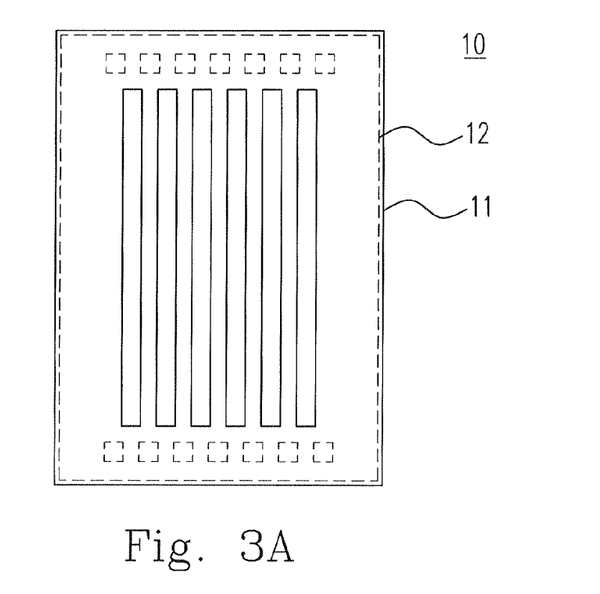
FIG. 3A is the schematic diagram showing a top view of an FFS LCD apparatus in the first embodiment of the present invention.

Please refer to FIGS. 3A, 3B and 3C. FIG. 3A shows a top view of an FFS LCD apparatus in the first embodiment of the present invention. In FIG. 3A, the FFS LCD apparatus 10 includes a first electrode 11 in a stacked relationship with a second electrode 12. A projection of the second electrode 12 onto the first electrode 11 is shown in phantom in FIG. 3A.

Figure 3B:
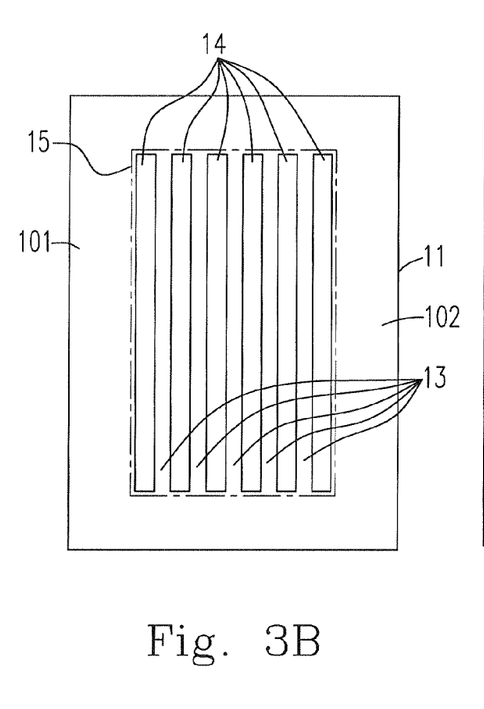
FIG. 3B is the schematic diagram showing a top view of the first electrode of the FFS LCD apparatus in FIG. 3A.

FIG. 3B shows a top view of the first electrode 11 of the FFS LCD apparatus in FIG. 3A without showing the second electrode 12 for clarity. In FIG. 3B, the first electrode 11 includes a first side edge 101, a second side edge 102, plural strips 13 and plural spacings 14, where the plural strips 13 are disposed between the first 101 and the second 102 side edges, and each of the plural spacings 14 is formed between every adjacent two of the plural strips 13 or between one of two side edges and one of the plural strips 13.

The plural strips 13 and the plural spacings 14 form a first area 15 indicated by the surrounded dash line. In making the first area 15 of the first electrode 11, preferably a plurality of substantially parallel longitudinal areas of electrode material is removed to define the plural spacings 14 so that the material remaining between the areas of removed electrode material defines the plural strips 13. The first electrode 11 preferably, has a rectangular shape and the area of the first electrode 13 that surrounds the first area 15 is preferably continuous with no vacancies, e.g. holes.

Figure 3C:
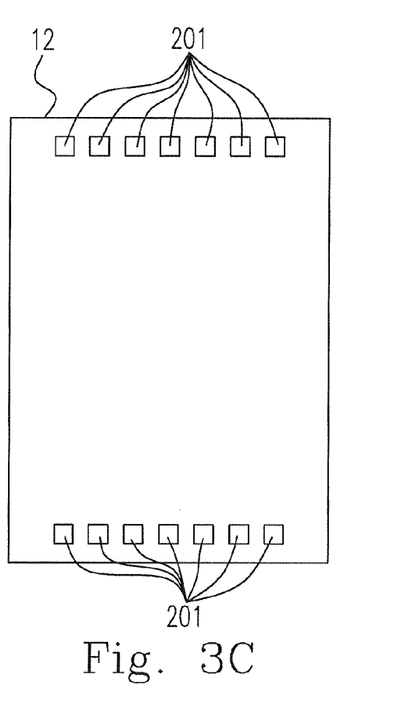
FIG. 3C is the schematic diagram showing a top view of the second electrode of the FFS LCD apparatus in FIG. 3A.

FIG. 3C shows a top view of the second electrode 12 of the FFS LCD apparatus in FIG. 3A without showing the first electrode 11 for clarity. The second electrode 12 can be disposed above or below the first electrode 11, and contains at least one penetrating vacancy 201, e.g. a hole, which has a projection onto the first electrode 11 located outside the first area 15. In FIG. 3C, the second electrode 12 contains several penetrating vacancies 201, which projections onto the first electrode 11 are located outside the first area 15. An area of the second electrode 12 without any vacancies preferably projects onto the entire first area 15 of the first electrode 11.

Generally, the first 11 and the second 12 electrodes are applied with opposite electrical charges, i.e. the positive and negative electrical charges, so as to generate the electrical field between them. Since the penetrating vacancies 201 are located outside the first area 15 from the top view, the projection of the second electrode 12 covers the first area 15, including the plural spacings 14, and the penetrating vacancies 201 do not influence the direction of the electrical field within the first area 15.

These penetrating vacancies 201 can reduce the entire area of the second electrode 12, thus can reduce the capacitance of the second electrode 12, in turn can shorten the charging time for the second electrode 12, and accordingly can significantly improve the response time of the LCD.

In this embodiment, the first electrode 11 can be a pixel electrode and the second electrode 12 can be a counter electrode, and the relative positions of these two electrodes can be interchanged. Both the first 11 and the second 12 electrodes can be made of transparent conductive material, e.g. indium tin oxide (ITO), tin oxide, fluorine-doped tin oxide, zinc oxide, aluminum-doped zinc oxide, gallium-doped zinc oxide, etc. The shape of the penetrating vacancies is not limited to the square shape disclosed in FIGS. 3A and 3C, and can have any shape, e.g. circular, ellipse, rectangular octagonal, irregular shapes, etc. based on the concept of the present invention.

Second Embodiment

Figure 4A:
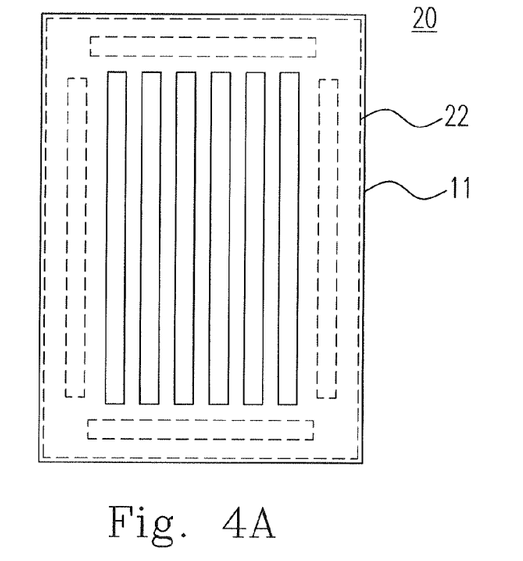
FIG. 4A is the schematic diagram showing a top view of an FFS LCD apparatus in the second embodiment of the present invention.
Figure 4B:
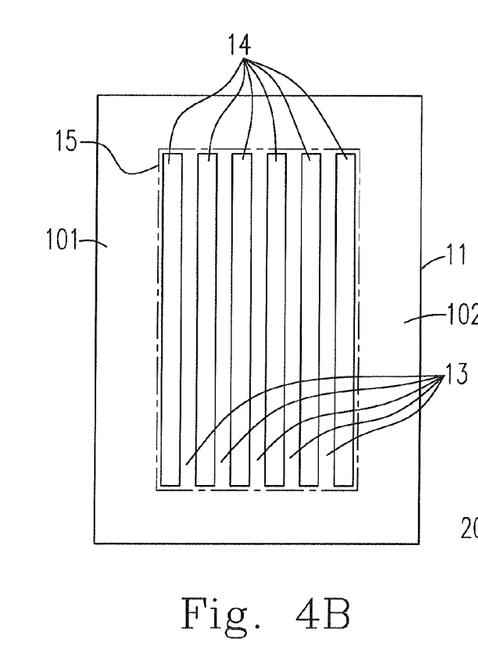
FIG. 4B is the schematic diagram showing a top view of the first electrode of the FFS LCD apparatus in FIG. 4A.
Figure 4C:
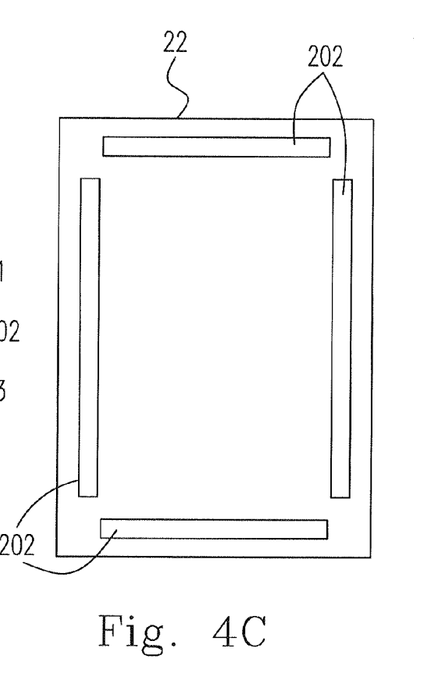
FIG. 4C is the schematic diagram showing a top view of the second electrode of the FFS LCD apparatus in FIG. 4A.

Please refer to FIG. 4A, which shows a top view of an FFS LCD apparatus in the second embodiment of the present invention showing the first electrode 11 in a stacked relationship with a second electrode 22; a projection of the second electrode onto the first electrode 11 is shown in phantom. FIG. 4B shows a top view of the first electrode 11 of the FFS LCD apparatus in FIG. 4A without showing the second electrode 22 for clarity. FIG. 4C shows a top view of the second electrode 22 of the FFS LCD apparatus in FIG. 4A without showing the first electrode 11 for clarity. The FFS LCD apparatus 20 in FIG. 4A includes the first electrode 11 and the second electrode 22. The first electrode 11 shown in FIGS. 4A and 4B of the present embodiment has the same structure as that in FIGS. 3A and 3B of the first embodiment, and therefore its structure is not repeatedly described here. Similarly, the second electrode 22 can be disposed above or below the first electrode 11, and has at least one penetrating vacancy 202, e.g. a slit, which has a projection onto the first electrode 11 and is located outside the first area 15. In the present embodiment, the second electrode 22 has four penetrating vacancies 202, e.g. four slits, which projections onto the first electrode 11 are located outside the first area 15.

Generally, the first 11 and the second 22 electrodes are applied with opposite electrical charges, i.e. the positive and negative electrical charges, so as to generate the electrical field between them. Since the penetrating vacancies 202 are located outside the first area 15 from the top view, the projection of the second electrode 22 covers the first area 15, including the plural spacings 14, and the penetrating vacancies 202 do not influence the direction of the electrical field within the first area 15.

The quantity, size and shape of the penetrating vacancies 202 are not limited and can be flexibly adjusted according to the practical requirements as long as their projections onto the first electrode 11 are located outside the first area 15 based on the concept of the present invention. Similarly, the first electrode 11 can be a pixel electrode and the second electrode 22 can be a counter electrode, and the relative positions of these two electrodes can be interchanged. Both the first 11 and the second 22 electrodes can be made of transparent conductive material, e.g. indium tin oxide (ITO), tin oxide, fluorine-doped tin oxide, zinc oxide, aluminum-doped zinc oxide, gallium-doped zinc oxide, etc.

Similarly, these penetrating vacancies 202 can reduce the entire area of the second electrode 22, thus can reduce the capacitance of the second electrode 22, in turn can shorten the charging time for the second electrode 22, and accordingly can significantly improve the response time of the LCD.

From the above, the penetrating vacancies 201 and 202 in the first and second embodiments can be penetrating holes or slits. Furthermore, these penetrating holes and slits can be combined together into one embodiment, that is, the second electrode can appropriately have the penetrating holes and slits together at the same time base on the concept of the present invention.

Third Embodiment

Figure 5A:
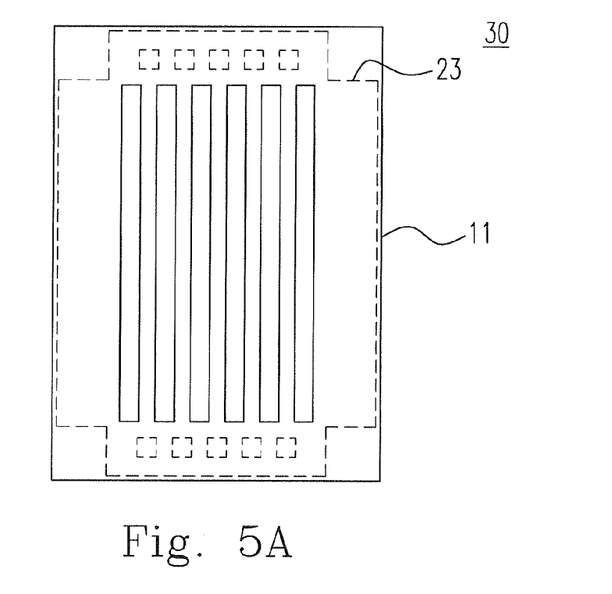
FIG. 5A is the schematic diagram showing a top view of an FFS LCD apparatus in the third embodiment of the present invention.
Figure 5B:
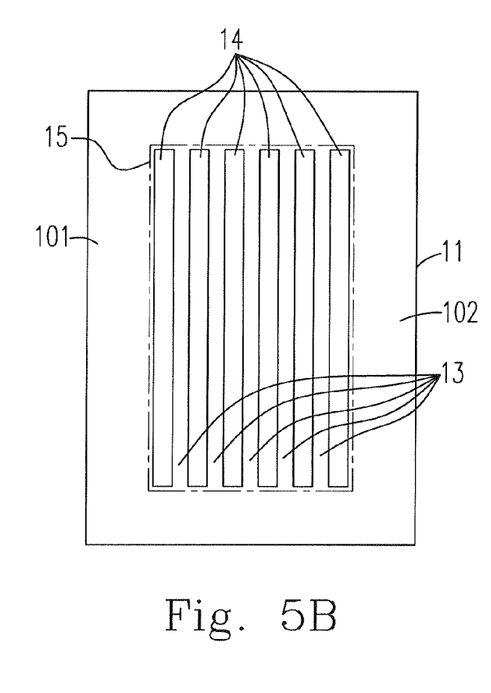
FIG. 5B is the schematic diagram showing a top view of the first electrode of the FFS LCD apparatus in FIG. 5A.
Figure 5C:
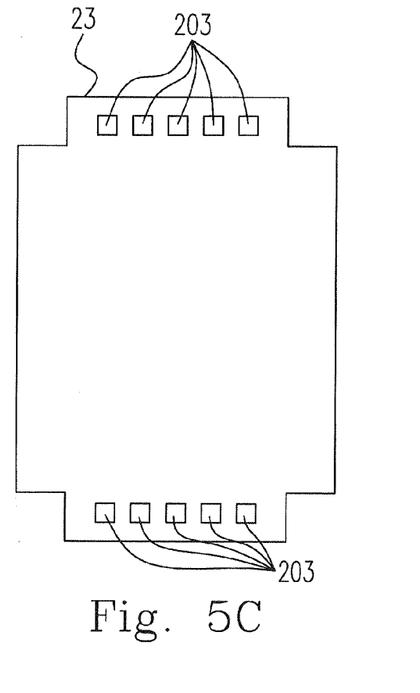
FIG. 5C is the schematic diagram showing a top view of the second electrode of the FFS LCD apparatus in FIG. 5A.

Please refer to the FIG. 5A, which shows a top view of an FFS LCD apparatus in the third embodiment of the present invention showing the first electrode 11 in a stacked relationship with a second electrode 23; a projection of the second electrode onto the first electrode 11 is shown in phantom. FIG. 5B shows a top view of the first electrode 11 of the FFS LCD apparatus in FIG. 5A without showing the second electrode 23 for clarity. FIG. 5C shows a top view of the second electrode 23 of the FFS LCD apparatus in FIG. 5A without showing the first electrode 11 for clarity. The FFS LCD apparatus 30 in FIG. 5A includes the first electrode 11 and the second electrode 23. Again, the first electrode 11 shown in FIGS. 5A and 5B of the present embodiment has the same structure as that in FIGS. 3A and 3B of the first embodiment, and therefore its structure is not repeatedly described here. Similarly, the second electrode 23 in this embodiment can be disposed above or below the first electrode 11, and has at least one penetrating vacancy 203, e.g. a penetrating hole, which has a projection onto the first electrode 11 located outside the first area 15. In the present embodiment, the second electrode 23 has several penetrating vacancies 203, e.g. penetrating holes, which projections onto the first electrode 11 are located outside the first area 15.

Compared with the second electrode 12 in FIG. 3C, the second electrode 23 in FIG. 5C of the present embodiment has been specifically designed to have the outline shape like a rectangle without the four corners so as to further reduce the area of the second electrode 23.

Generally, the first 11 and the second 23 electrodes are applied with opposite electrical charges, i.e. the positive and negative electrical charges, so as to generate the electrical field between them. Since the penetrating vacancies 203 are located outside the first area 15 from the top view, the projection of the second electrode 23 covers the first area 15, including the plural spacings 14, and the penetrating vacancies 203 do not influence the direction of the electrical field within the first area 15.

Similarly, the first electrode 11 can be a pixel electrode and the second electrode 22 can be a counter electrode, and the relative positions of these two electrodes can be interchanged. The shape of the penetrating vacancies 203 is not limited to the square shape disclosed in FIGS. 5A and 5C, and can have any shape. Both the first 11 and the second 23 electrodes can be made of transparent conductive material, e.g. indium tin oxide (ITO), tin oxide, fluorine-doped tin oxide, zinc oxide, aluminum-doped zinc oxide, gallium-doped zinc oxide, etc.

Similarly, these penetrating vacancies 203 can reduce the entire area of the second electrode 23, thus can reduce the capacitance of the second electrode 23, in turn can shorten the charging time for the second electrode 23, and accordingly can significantly improve the response time of the LCD.

Fourth Embodiment

Figure 6A:
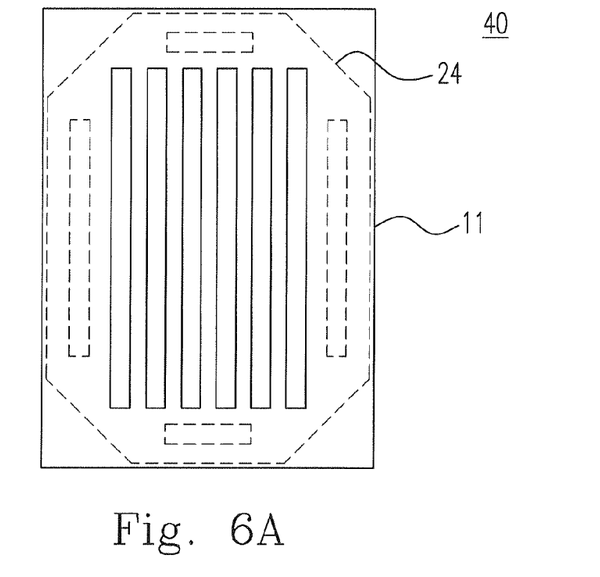
FIG. 6A is the schematic diagram showing a top view of an FFS LCD apparatus in the fourth embodiment of the present invention.
Figure 6B:
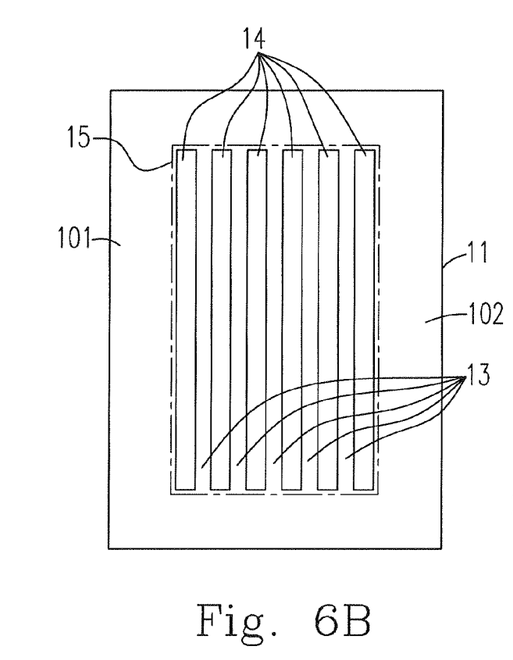
FIG. 6B is the schematic diagram showing a top view of the first electrode of the FFS LCD apparatus in FIG. 6A.
Figure 6C:
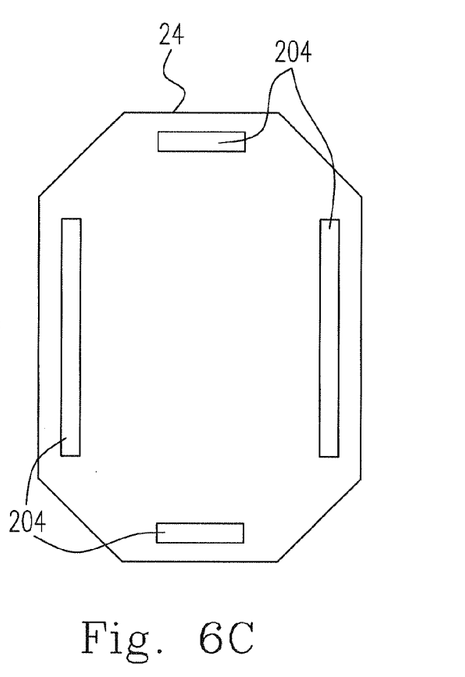
FIG. 6C is the schematic diagram showing a top view of the second electrode of the FFS LCD apparatus in FIG. 6A.

Please refer to FIG. 6A, which shows a top view of an FFS LCD apparatus in the fourth embodiment of the present invention showing the first electrode 11 in a stacked relationship with a second electrode 24; a projection of the second electrode onto the first electrode 11 is shown in phantom. FIG. 6B shows a top view of the first electrode 11 of the FFS LCD apparatus in FIG. 6A without showing the second electrode 24 for clarity. FIG. 6C shows a top view of the second electrode 24 of the FFS LCD apparatus in FIG. 6A without showing the first electrode 11 for clarity. The FFS LCD apparatus 40 in FIG. 6A includes the first electrode 11 and the second electrode 24. Again, the first electrode 11 shown in FIGS. 6A and 6B of the present embodiment has the same structure as that in FIGS. 3A and 3B of the first embodiment, and therefore its structure is not repeatedly described here. Similarly, the second electrode 24 in this embodiment can be disposed above or below the first electrode 11, and has at least one penetrating vacancy 204, e.g. a penetrating slit, which has a projection onto the first electrode 11 located outside the first area 15. In the present embodiment, the second electrode 24 has several penetrating vacancies 204, e.g. penetrating slits, which projections onto the first electrode 11 are located outside the first area 15.

Compared with the second electrode 22 in FIG. 4C of the second embodiment, the second electrode 24 in FIG. 6C of the present embodiment has been specifically designed to have a polygonal shape with n sides, where n is an integer larger than 4, e.g. octagonal shape with n sides and n equal to 8. The area of the second electrode 24 in this embodiment is smaller than that of the second electrode 22 in the second embodiment so as to further reduce the area of the projection of the electrode material of the second electrode 24 onto the first electrode 11 while maintaining an area of the second electrode 12 without any vacancies that projects onto the entire first area 15 of the first electrode 11.

Similarly, the first 11 and the second 24 electrodes are applied with opposite electrical charges, i.e. the positive and negative electrical charges, so as to generate the electrical field between them. Since the penetrating vacancies 204 are located outside the first area 15 from the top view, the projection of the second electrode 24 covers the first area 15, including the plural spacings 14, and the penetrating vacancies 204 do not influence the direction of the electrical field within the first area 15.

The quantity, size and shape of the penetrating vacancies 204 are not limited and can be flexibly adjusted according to the practical requirements as long as their projections are located outside the first area 15 based on the concept of the present invention. Similarly, the first electrode 11 can be a pixel electrode and the second electrode 24 can be a counter electrode, and the relative positions of these two electrodes can be interchanged. Both the first 11 and the second 23 electrodes can be made of transparent conductive material, e.g. indium tin oxide (ITO), tin oxide, fluorine-doped tin oxide, zinc oxide, aluminum-doped zinc oxide, gallium-doped zinc oxide, etc.

Both the penetrating vacancies 204 and the octagonal shape of the second electrode 24 can reduce the entire area of the second electrode 24, thus can reduce the capacitance of the second electrode 24, in turn can shorten the charging time for the second electrode 24, and accordingly can significantly improve the response time of the LCD.

Figure 7A:
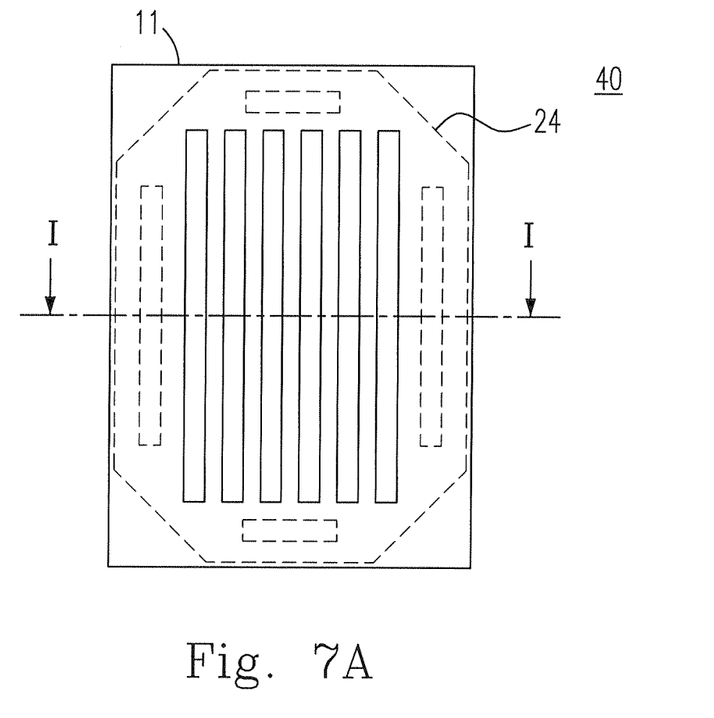
FIG. 7A is the schematic diagram showing a top view of an FFS LCD apparatus with the indicated cross-sectional line in the fourth embodiment of the present invention.
Figure 7B:
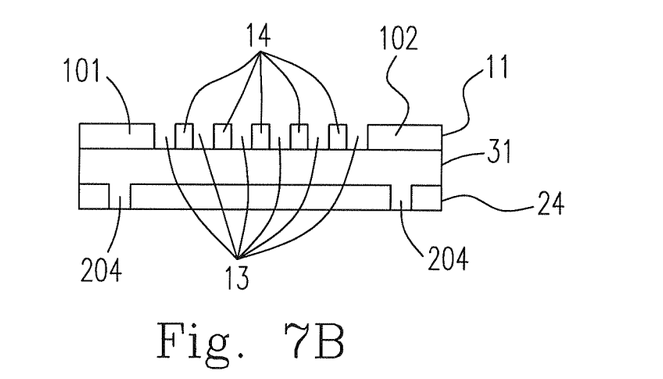
FIG. 7B is the schematic diagram showing a cross-sectional view of the FFS LCD apparatus in FIG. 7A.

In order to well illustrating the present invention, the present embodiment is further illustrated in FIGS. 7A and 7B. FIG. 7A shows a top view of an FFS LCD apparatus with the indicated cross-sectional line I in the fourth embodiment of the present invention, and is the same as FIG. 6A except an additional cross-sectional line I. FIG. 7B shows a cross-sectional view of the FFS LCD apparatus in FIG. 7A along the cross-sectional line I. Preferably, the FFS LCD is of a type where there is no liquid crystal material disposed between the first 11 and second 24 electrodes. In FIG. 7B, an insulating layer 31 is disposed between the first 11 and the second 24 electrodes for separating these two electrodes. The insulating layer 31 can be made of oxide, nitride or other insulating materials. Similarly, each of the FFS LCD apparatuses in the first, second and third embodiments can have an insulating layer disposed between the first electrode and the second electrode for separating these two electrodes and building an electrical field therebetween.

From the above, the outline shape of the second electrode is not limited to those illustrated in the third and fourth embodiments, and can be flexibly designed to have any shape as long as the area of the second electrode is smaller than that of the original rectangular second electrode so as to further reduce the capacitance of the second electrode. Moreover, the shape of the second electrode with smaller area can be combined with the penetrating vacancies illustrated in the first and second embodiments together to enhance the reduction of the capacitance of the second electrode in the FFS LCD apparatus.

Fifth Embodiment

Furthermore, an FFS LCD device in this embodiment can include a first electrode 11 and a second electrode disposed above or below the first electrode 11, where the second electrode has plural edges and at least one capacitance-reduction device disposed on at least one of the plural edges, and the first electrode 11 can be the same as those illustrated in the above first, second, third and fourth embodiments. The capacitance-reduction device can be the penetrating vacancies, including the penetrating holes 201 and the penetrating slits 202, described in the first and second embodiments, or any insulating substance disposed at the places where the penetrating holes 201 and the penetrating slits 202 are originally located so as to reach the capacitance reduction on the second electrode.

Similarly, the quantity, size and shape of the capacitance-reduction device is not limited and can be flexibly adjusted according to the practical requirements as long as its projections onto the first electrode 11 is located outside the first area 15 based on the concept of the present invention. Similarly, the first electrode 11 can be a pixel electrode and the second electrode can be a counter electrode, and the relative positions of these two electrodes can be interchanged. Both the first 11 and the second electrodes in this embodiment can be made of transparent conductive material, e.g. indium tin oxide (ITO), tin oxide, fluorine-doped tin oxide, zinc oxide, aluminum-doped zinc oxide, gallium-doped zinc oxide, etc.

Preferably, the second electrode has a plurality of capacitance-reduction devices that have projections onto a border area surrounding a fringe field switching area of the first electrode on at least two opposite sides of the fringe field switching area. Preferably, the second electrode has a plurality of capacitance-reduction devices that have symmetric projections onto the border area of the first electrode on at least two opposite sides of the fringe field switching area. Preferably the fringe field switching area of the first electrode is defined by a plurality of substantially parallel spacings that define a plurality of substantially parallel strips. Preferably the fringe field switching area spacings are of a uniform size and the fringe field switching area strips are of a uniform size which may or may not be the same size as the spacings.

The examples of the present invention are described in the followings.

1. A fringe field switching (FFS) liquid crystal display (LCD) apparatus includes a first electrode in a stacked relationship with a second electrode. The first electrode includes a first side edge, a second side edge, plural strips disposed between the first and the second side edges, and plural spacings, each of which is formed between every adjacent two of the plural strips, wherein the plural strips and the plural spacings form a first area. The second electrode has at least a penetrating vacancy, which has a projection onto the first electrode located outside the first area. Preferably, the second electrode has an area without any vacancies that has a projection onto the first electrode covering the first area 2. A fringe field switching (FFS) liquid crystal display (LCD) apparatus includes a first electrode and a second electrode. The second electrode is disposed in one of places above and below the first electrode, and has a polygonal shape having n sides, wherein n is an integer larger than four.

3. An FFS LCD apparatus of any one of the previous examples, wherein the first electrode includes a first side edge, a second side edge, plural strips disposed between the first and the second side edges, and plural spacings, each of which is formed between every adjacent two of the plural strips.

4. An FFS LCD apparatus of any one of the previous examples, wherein the second electrode comprises a penetrating vacancy being one of a penetrating hole and a penetrating slit.

5. A fringe field switching (FFS) liquid crystal display (LCD) apparatus includes a first electrode, and a second electrode. The second electrode is disposed on one of places above and below the first electrode, and has plural edges and at least a capacitance-reduction device disposed on at least one of the plural edges.

6. An FFS LCD apparatus of any one of the previous examples, further comprising an insulating layer disposed between the first electrode and the second electrode.

7. An FFS LCD apparatus of any one of the previous examples, wherein each of the first and the second electrodes includes a transparent conductive material, and the insulating layer includes one of an oxide and a nitride.

8. An FFS LCD apparatus of any one of the previous examples, wherein the first electrode includes a first side edge, a second side edge, plural strips disposed between the first and the second side edges, and plural spacings formed, each of which is formed between every adjacent two of the plural strips, wherein the plural strips and the plural spacings form a first area, and the capacitance-reduction device has a projection located outside the first area.

9. An FFS LCD apparatus of any one of the previous examples, wherein the second electrode has a projection covering the plural spacings.

10. An FFS LCD apparatus of any one of the previous examples, wherein the capacitance-reduction device comprises one of a penetrating hole and a penetrating slit.

11. An FFS LCD apparatus of any one of the previous examples, wherein the first electrode is a pixel electrode when the second electrode is a counter electrode, while the first electrode is a counter electrode when the second electrode is a pixel electrode.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A fringe field switching (FFS) liquid crystal display (LCD) apparatus, comprising:
    an FFS structure including:
        a first electrode including:
            a first side edge;
            a second side edge; and
            plural spacings that define plural strips between the first and the second side edges, where each strip is formed between two of the plural spacings, wherein the plural strips and the plural spacings form a first area; and
        a second electrode in a stacked relationship with the first electrode, and having at least a penetrating vacancy formed inside the second electrode and within the FFS structure, wherein the penetrating vacancy has a projection onto the first electrode located outside the first area.

2. An FFS LCD apparatus of claim 1, further comprising an insulating layer disposed between the first electrode and the second electrode.

3. An FFS LCD apparatus of claim 2, wherein each of the first and the second electrodes includes a transparent conductive material, and the insulating layer includes one of an oxide and a nitride.

4. An FFS LCD apparatus of claim 1, wherein the second electrode has a projection of an area without any vacancies onto the first electrode covering the plural spacings.

5. An FFS LCD apparatus of claim 1, wherein the penetrating vacancy includes one of a penetrating hole and a penetrating slit.

6. An FFS LCD apparatus of claim 1, wherein the first electrode is a pixel electrode when the second electrode is a counter electrode, while the first electrode is a counter electrode when the second electrode is a pixel electrode.

7. A fringe field switching (FFS) liquid crystal display (LCD) apparatus, comprising:
    an FFS structure including:
        a first electrode including:
            a first side edge;
            a second side edge; and
            plural spacings defining plural strips disposed between the first and the second side edges, wherein each of the plural strips is formed between two of the plural spacings; and
        a second electrode disposed in a stacked relationship with the first electrode without liquid crystal material disposed there between, and having a polygonal shape having n sides, wherein n is an integer larger than four, that has a projection onto the first electrode, wherein the polygonal shape relates to a rectangular shape having a cutout, the polygonal shape and the cutout form the rectangular shape, and the cutout has a projection within the first electrode.

8. An FFS LCD apparatus of claim 7, further comprising an insulating layer disposed between the first electrode and the second electrode.

9. An FFS LCD apparatus of claim 8, wherein each of the first and the second electrodes includes a transparent conductive material, and the insulating layer includes one of an oxide and a nitride.

10. An FFS LCD apparatus of claim 7, wherein the second electrode has a projection of an area without any vacancies onto the first electrode covering the plural spacings.

11. An FFS LCD apparatus of claim 7, wherein the second electrode comprises a penetrating vacancy being one of a penetrating hole and a penetrating slit.

12. An FFS LCD apparatus of claim 7, wherein the first electrode is a pixel electrode when the second electrode is a counter electrode, while the first electrode is a counter electrode when the second electrode is a pixel electrode.

13. A fringe field switching (FFS) liquid crystal display (LCD) apparatus, comprising:
    an FFS structure including:
        a first electrode including:
            a first side edge;
            a second side edge; and
            plural spacings defining plural strips disposed between the first and the second side edges, wherein each of the plural strips is formed between two of the plural spacings; and
        a second electrode disposed in a stacked relationship with the first electrode, and having plural edges and at least a capacitance-reduction device, wherein the capacitance-reduction device is formed inside the second electrode and within the FFS structure, and disposed on at least one of the plural edges, that has a projection onto the first electrode.

14. An FFS LCD apparatus of claim 13, further comprising an insulating layer disposed between the first electrode and the second electrode.

15. An FFS LCD apparatus of claim 14, wherein each of the first and the second electrodes includes a transparent conductive material, and the insulating layer includes one of an oxide and a nitride.

16. An FFS LCD apparatus of claim 13, wherein:
the plural strips and the plural spacings form a first area, and the capacitance-reduction device has a projection onto the first electrode located outside the first area.

17. An FFS LCD apparatus of claim 16, wherein the second electrode has a projection of an area without any vacancies onto the first electrode covering the plural spacings.

18. An FFS LCD apparatus of claim 13, wherein the capacitance-reduction device comprises one of a penetrating hole and a penetrating slit.

19. An FFS LCD apparatus of claim 13, wherein the first electrode is a pixel electrode when the second electrode is a counter electrode, while the first electrode is a counter electrode when the second electrode is a pixel electrode.

\* \* \* \* \*